United States Patent
Graben et al.

(10) Patent No.: US 10,843,326 B2
(45) Date of Patent: Nov. 24, 2020

(54) COMPRESSION-HELD BRACKET

(71) Applicant: Brennan Equipment and Manufacturing Inc., University Park, IL (US)

(72) Inventors: Kyle Graben, University Park, IL (US); Peter Sullivan, University Park, IL (US)

(73) Assignee: Brennan Equipment and Manufacturing Inc., University Park, IL (US)

( * ) Notice: Subject to any disclaimer, the term of this patent is extended or adjusted under 35 U.S.C. 154(b) by 436 days.

(21) Appl. No.: 15/906,547

(22) Filed: Feb. 27, 2018

(65) Prior Publication Data

US 2019/0264719 A1    Aug. 29, 2019

(51) Int. Cl.
*B25H 1/00* (2006.01)
*F16M 13/02* (2006.01)

(52) U.S. Cl.
CPC .......... *B25H 1/0021* (2013.01); *F16M 13/02* (2013.01); *Y10T 292/0917* (2015.04)

(58) Field of Classification Search
CPC ............ A47B 31/00; A47B 2200/0085; A47B 2200/07; B25H 1/00; B25H 1/0021; B25H 1/02; B25H 1/04; B25H 3/00; B25H 3/04; F16B 2/18; F16B 12/32; F16B 12/38; F16M 13/02; Y10T 292/0917; Y10T 403/44; Y10T 403/447; Y10T 403/4621
USPC ...... 403/217, 219, 237; 292/113; 248/219.2, 248/219.4, 220.1, 222.11, 540
See application file for complete search history.

(56) References Cited

U.S. PATENT DOCUMENTS

| | | | | |
|---|---|---|---|---|
| 4,890,869 A * | 1/1990 | Langkamp, Jr. | ........ | E05C 19/14 292/113 |
| 5,271,649 A * | 12/1993 | Gromotka | ............... | E05C 19/14 292/113 |
| 5,480,197 A * | 1/1996 | Ernst | ................... | B01D 46/0004 292/113 |
| 6,123,314 A * | 9/2000 | Steele | ................... | F16B 5/0642 248/222.11 |
| 7,156,429 B2 * | 1/2007 | Eriksson | ................. | F16B 2/185 292/113 |
| 7,845,501 B1 * | 12/2010 | Fosburg | ................... | B25H 3/04 211/103 |
| 8,567,828 B2 * | 10/2013 | Andren | .................. | A45C 13/02 292/113 |
| 10,113,574 B1 * | 10/2018 | Bileth | ...................... | B25H 1/02 |
| 10,288,218 B2 * | 5/2019 | Strecker | ................. | F16M 13/02 |
| 10,302,115 B2 * | 5/2019 | Bickers | ................... | F16B 12/38 |
| 10,492,605 B2 * | 12/2019 | Jost | ......................... | A47B 96/14 |

\* cited by examiner

*Primary Examiner* — Josh Skroupa
(74) *Attorney, Agent, or Firm* — Seyfarth Shaw LLP (57) ABSTRACT

A bracket for a board that removably couples to a base. The bracket can include a slot at one end and a compression member at the other end. The slot can fit over the base at a first end of the base and can be removed from that end of the base upon removal of the compression member at the other end of the base. The compression member can be removed against a bias such that the compression member applies a bias to the base when the bracket is coupled to the base, and that bias can be removed so as to allow the removal of the bracket. A pegboard or other type of board can be coupled to the bracket with fasteners or other known means.

18 Claims, 8 Drawing Sheets

COMPRESSION-HELD BRACKET

TECHNICAL FIELD OF THE INVENTION

The present application relates generally to brackets. More particularly, the present application relates to a compression-held bracket capable of holding a board on a base.

BACKGROUND OF THE INVENTION

Work tables are a common and convenient element of a workshop, whether for a professional or do-it-yourself ("DIY") handymen. Work tables help organize tools and provide a durable surface to assemble objects and fasteners, cut material, operate on objects with tools, and other activities.

Many work tables include pegboards at the rear of the table. For example, a pegboard can include holes that receive organizational attachments such as hooks or other holders of tools. The pegboard provides a durable and easily customized arrangement so the user can arrange his or her tools and other components in a specific configuration.

Current pegboard work tables include a pegboard permanently attached to the table by a weld or other permanent connection structure, such that a separate table must be made for the pegboard and non-pegboard options. A company selling both a table with and without a pegboard therefore must maintain two separate tables in inventory rather than allowing one table to either be fit with a pegboard or sold without a pegboard, depending on the customer's preference.

Some pegboard work tables brackets with grips at one end and tabs at the other to removably couple the pegboard to the table. Such a work table was discussed in U.S. patent application Ser. No. 15/285,076, the contents of which are incorporated by reference herein in their entirety.

SUMMARY OF THE INVENTION

The presently disclosed embodiments include a bracket for a pegboard, for example, that removably couples to a cabinet, cart, or table with a lip edge. The bracket fits over sheet metal or any other thin base and engages a corner of the base at one end. At the other end, the bracket applies a bias to another corner of the base so as to collectively apply a compression force to the base. A pegboard can then be coupled to the bracket with fasteners or other known means.

For example, the presently disclosed embodiments include a bracket for coupling to a base. The bracket can include an arm having a first end and a second end opposite the first end, a corner slot located at the first end and including an opening adapted to receive a first end of the base when positioned on the base, and a compression member at the second end, the compression member having a compression member body pivotable about a pivot point and a hook extending from the compression member body to engage a second end of the base opposite the first end of the base. The compression member can be engaged with the base such that, when the compression member is positioned in a first position on the base wherein the hook is engaged against the base, the compression member applies a bias force against the base, and wherein when the compression member rotates about the pivot point to a second position, the compression member disengages the hook from the base and allows removal of the bracket from the base.

Further disclosed is a bracket and base combination including a base having at least one corner, and a bracket including an arm having a first end and a second end opposite the first end. The bracket can further include a corner slot located at the first end, where the corner slot can include an opening adapted to receive a first end of the base when positioned on the base. The bracket can also include a compression member at the second end. The compression member can have a compression member body pivotable about a pivot point and a hook extending from the compression member body to engage a second end of the base opposite the first end of the base. The compression member is engaged with the base such that, when the compression member is positioned in a first position on the base wherein the hook is engaged against the base, the compression member applies a bias force against the base, and wherein when the compression member rotates about the pivot point to a second position, the compression member disengages the hook from the base and allows removal of the bracket from the base.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include a bracket for a board that removably couples to a base. The bracket can include a slot that fits over the base at one end of the bracket, and a compression member that engages a corner of the base at the other end of the bracket. A pegboard or other type of board can then be coupled to the bracket with fasteners or other known means.

Figure 1:
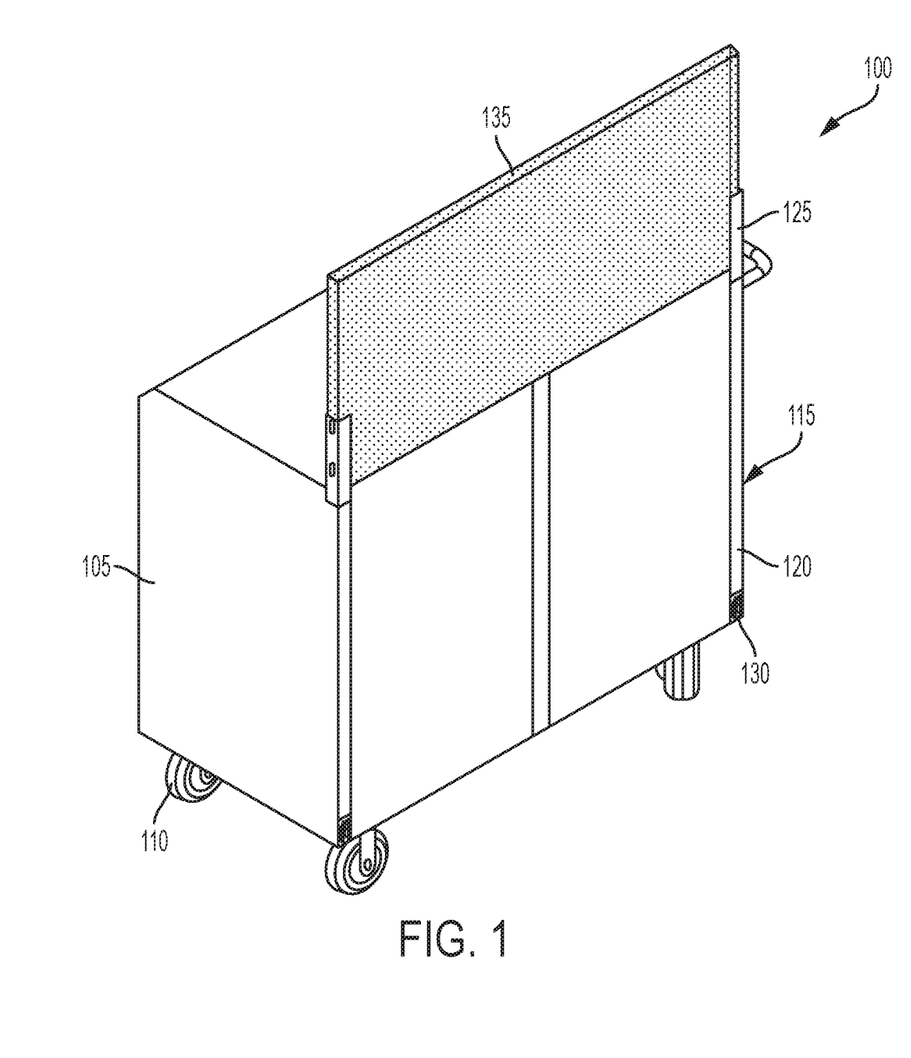
FIG. 1 is a top perspective view of a bracket system according to at least one of the presently disclosed embodiments.
Figure 2:
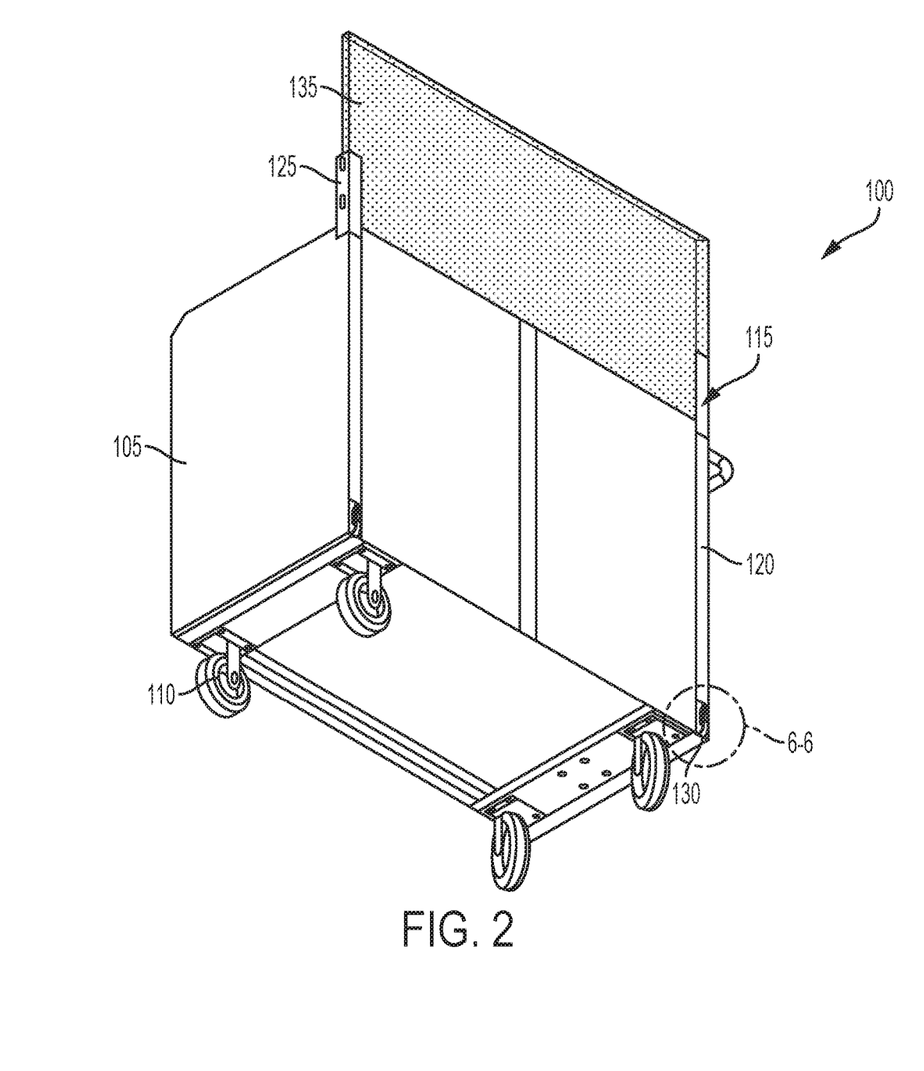
FIG. 2 is a bottom perspective view of a bracket system according to at least one of the presently disclosed embodiments.

As shown in FIGS. 1 and 2, a cart 100 is illustrated and includes a base 105 with wheels 110 coupled to the base 105 for movability purposes. One or more brackets 115 can be coupled to the base 105 and can include an arm 120 connecting a corner slot 125 at a first end, and a compression member 130 at a second end opposite the first end. The brackets 115 can receive and be coupled to a board 135 at the first end within the corner slot 125.

The base 105 can be any structure capable of receiving the bracket 115. As shown, the base 105 is a rectangular prism made of a sheet metal type material and configuration, but the present invention is not so limited. For example, the base 105 can be any size or shape capable of receiving the corner slot 125 at a first end and a compression member 130 at a second end opposite the first end.

The arm 120 can be any structure capable of coupling the corner slot 125 and compression member 130 together. As shown, the arm 120 can be a flat, sheet metal type material and configuration, but the present invention is not so limited. The arm 120 can alternatively be a rod-like shape, or any other shape capable of coupling the slot 125 and compression member 130 together. The arm 120 can also be multiple structures coupled together, including but not limited to a chain, or multiple pieces of sheet metal coupled together and capable of folding to a more compact arrangement. Also as shown, the arm 120 can include a single piece of flat material extending along the base 105, but the arm 120 can alternatively include multiple pieces, for example, one piece on each side of the base 105, for added structural stability. Any other structural or functional equivalent of the arm 120 can be implemented without departing from the sprit and scope of the present invention.

As shown and as discussed herein, the board 135 can be a pegboard. However, any structure of board 135 can be implemented without departing from the spirit and scope of the present invention. For example, and without limitation, the board 135 can be a pegboard, bulletin board, chalk board, wooden board, dry erase board, or any other type of board that fits within the brackets 115.

Figure 3:
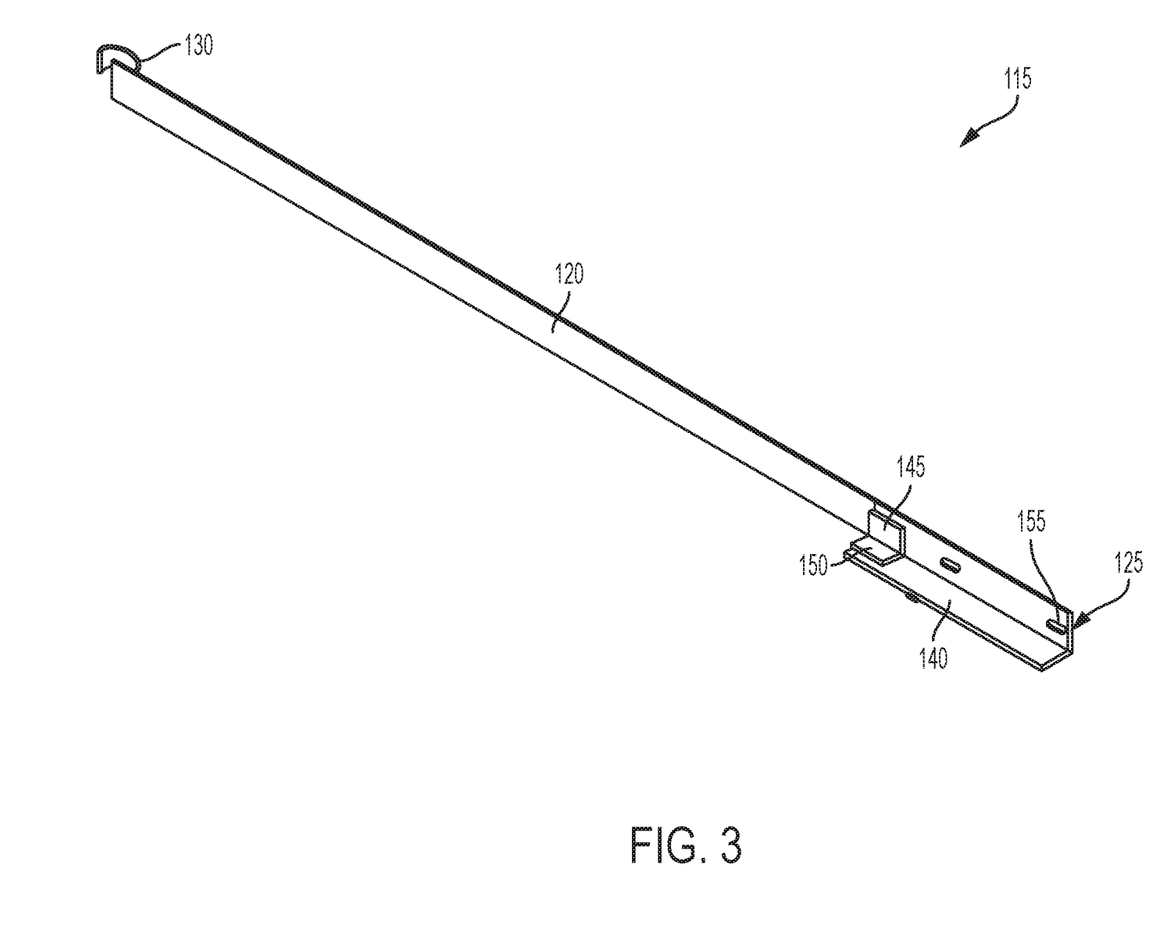
FIG. 3 is a front perspective view of a bracket according to at least one of the presently disclosed embodiments.
Figure 4:
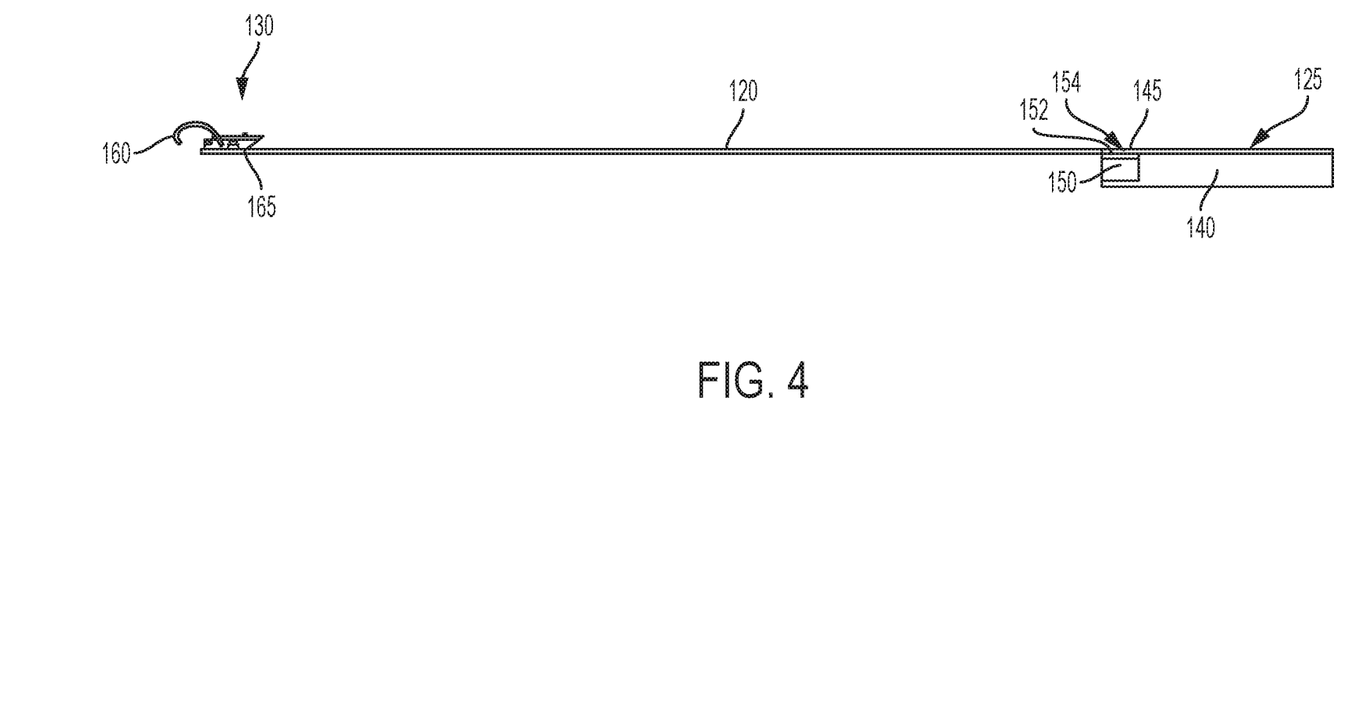
FIG. 4 is a side view of a bracket according to at least one of the presently disclosed embodiments.
Figure 5:
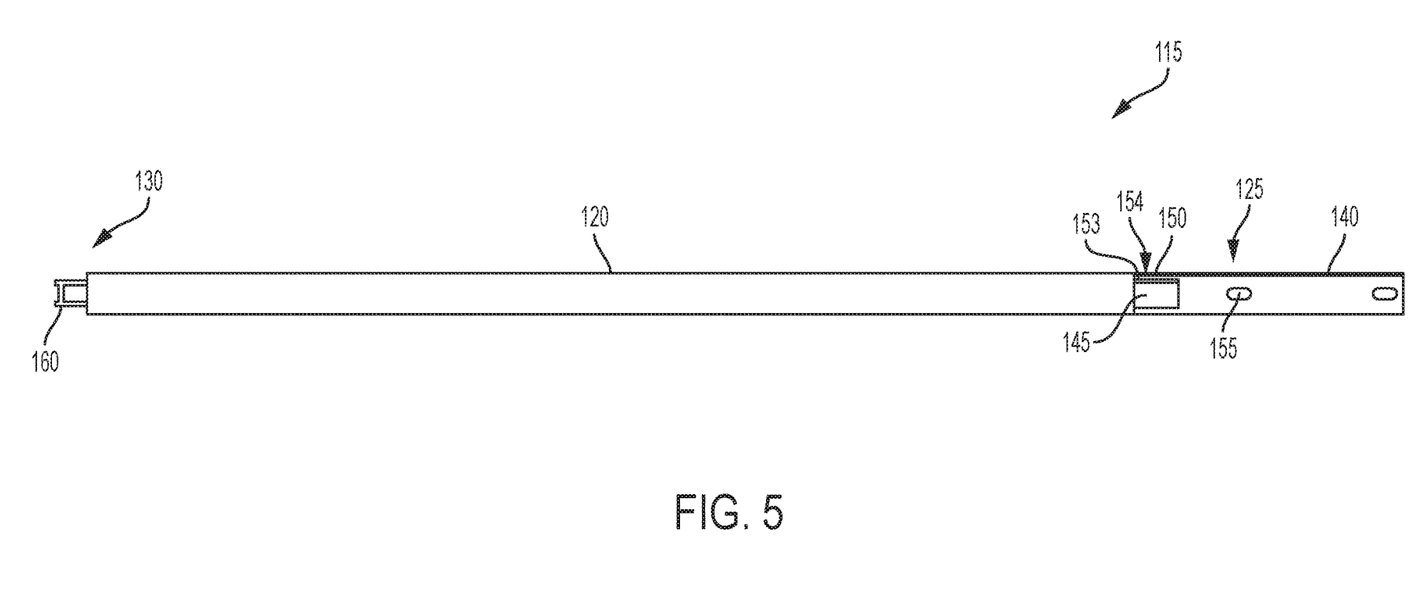
FIG. 5 is a bottom view of a bracket according to at least one of the presently disclosed embodiments.

FIGS. 3-5 illustrate various views of the bracket 115 according to at least one of the presently disclosed embodiments. As shown, the compression member 130 can be located at a second end opposite the first end, which can include a corner slot 125. The corner slot 125 can be made of several flat pieces of material, for example sheet metal, that are formed so as to create a slot that can fit within a lip edge or corner of a base 105. The compression member 130 can then apply compression to the base 105, with the corner slot 125 providing the requisite counterforce.

As shown, the corner slot 125 can include a side plate 140 located, for example, perpendicular to the arm 120 and adapted to provide a second support portion for the board 135. The side plate 140 can be located on either the rear or side surface of the board 135, for example, or any other configuration that allows for support of the board 135.

The corner slot 125 can also include a first slot plate 145 and a second slot plate 150 located perpendicular to the first slot plate 145, so as to create a slot-shaped opening that a corresponding corner of the base 105 can fit within. For example, the first 145 and second 150 slot plates can be spaced from the arm 120 and side plate 140, respectively, and form a first 152 and second 153 slot, respectively. The first 152 and second 153 slots can then collectively form an opening 154 that receives a corner of the base 105 and engages the corner slot 125 against the base 105. For example, the opening 154 can face the second end of the bracket 115 having the compression member 130 to allow the corner of the base 105 to be inserted into the opening 154 prior to further securing with the compression member 160.

The corner slot 125 can also include holes 155 that allow a fastener, such as a screw, bolt, nail, or any other fastener, to couple the board 135 to the corner piece 125. For example, the holes 155 can be located on the arm 120 and couple to a front, rear, or side portion of the board 135. Alternatively, the holes 155 can be coupled to the side plate 140, or further alternatively, both the side plate 140 and the arm 120 can include the holes 155. In some embodiments, no holes 155 are present and the board 135 can be coupled to the bracket 115 through adhesive, magnetic connections, Velcro®, or any other coupling arrangement.

Figure 6:
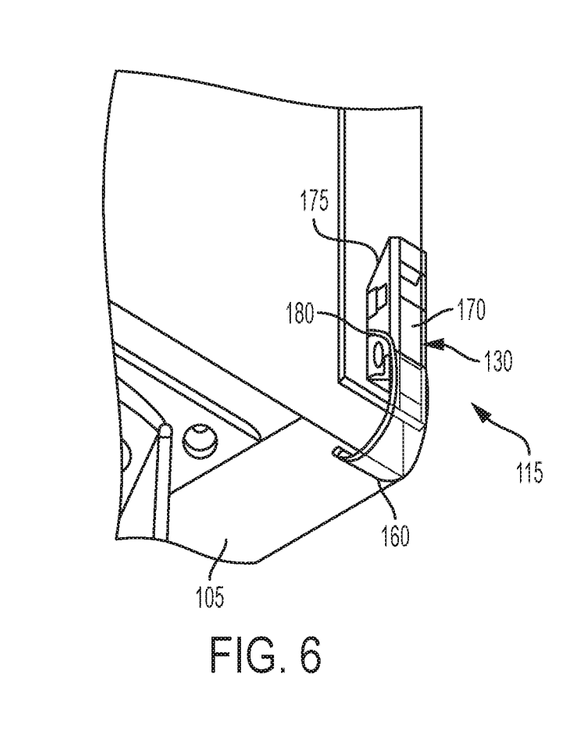
FIG. 6 is a partial enlarged view of a compression member as indicated by line 6-6 in FIG. 2 according to at least one of the presently disclosed embodiments.

FIGS. 5 and 6 illustrate the compression member 130 in more detail. As shown, the compression member 130 can include a hook 160 that grips onto an end of the base 105 and applies a force to ensure the bracket 115 is held in compression about the base 105. The compression member 130 can also include a latch 165 that allows a user to engage and disengage the hook 160. For example, as shown in FIG. 6, the compression member 130 can include a compression member body 170 with a grip 175 that the user can grip with their finger to engage or disengage the hook 160 about the base 105. The compression member 130 can then pivot about the pivot point 180. For example, the grip 175 can be spaced from the pivot point 180 and allow a user to lift the compression member 130 to engage or disengage the hook 160.

In some embodiments, the function of the compression member 130 is similar to a buckle on a ski boot. For example, the hook 160 and compression member body 170 can be coupled to a strap or other elongated object. The compression member body 170 can then move across ratchet components on the strap when the hook 160 extends toward the base 105 and lock in a position that creates a shorter strap due to the movement along the ratchet components. When the hook 160 engages the base 105, the compression member body 170 can be retracted to its rest position and, due to the shorter portion of the strap being used, the compression member body 170 will apply a compression force against the body with the corner slot 125 providing the opposite compressive force. The board 135 can then be coupled to the bracket 115 at the holes 155 to provide a removable board 135 on the bracket 115.

Figure 7:
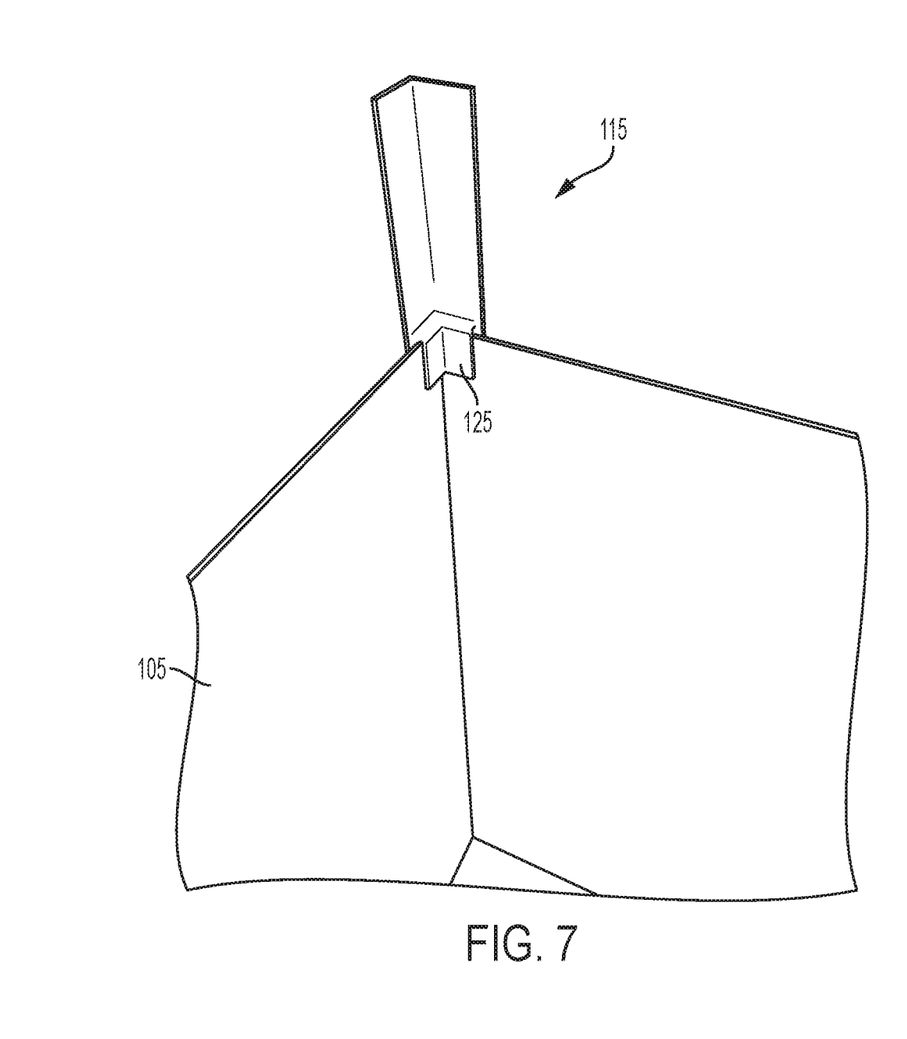
FIG. 7 is a top perspective view of a bracket on a base according to at least one of the presently disclosed embodiments.
Figure 8:
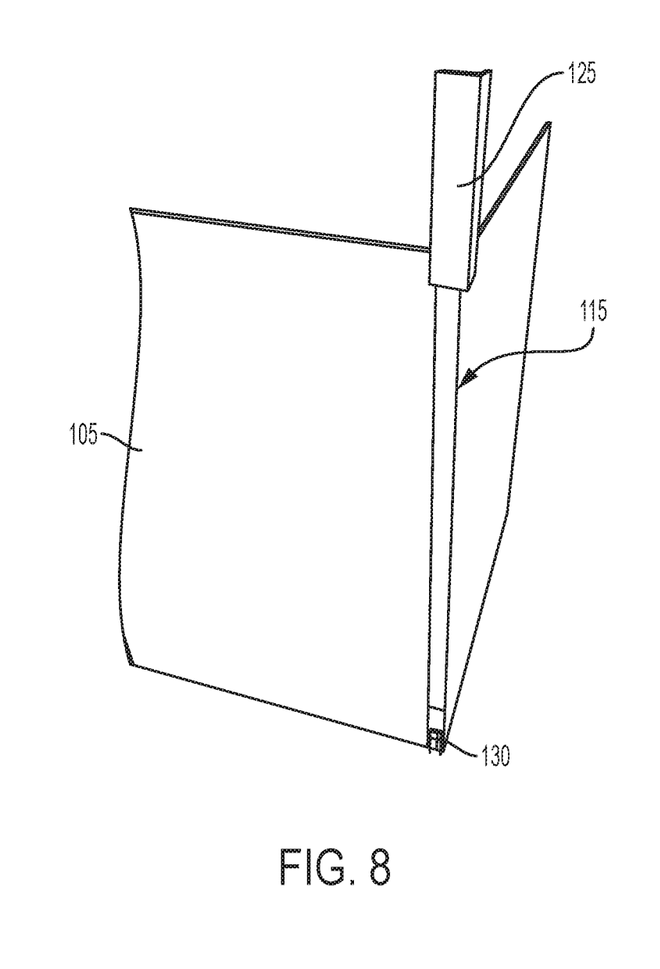
FIG. 8 is a rear perspective view of a bracket on a base according to at least one of the presently disclosed embodiments.

FIGS. 7 and 8 illustrate another example of the bracket 115 as implemented on a cart 100 or other such object. As shown in FIG. 7, the bracket 115 can slide onto the base 105 at the corner slot 125. As shown in FIG. 8, the bracket 115 can include a compression member 130 at the end opposite the corner slot 125. The compression member 130 can engage the base 105 after insertion of the corner slot 125 onto the base 105 to couple the bracket 115 onto the base 105. For example, the compression member 130 can apply a bias force against the base 105 and cause a counterforce from the corner slot 125 to thereby place the bracket 115 in compression about the base 105. For example, as discussed above in more detail, when the compression member 130 is positioned in a first position where the hook 160 is engaged against the base 105, the compression member 130 applies a bias force against the base 105. When the compression member 130 rotates about the pivot point 180 to a second position, the compression member 130 disengages the hook 160 from the base 105 and allows removal of the bracket 115.

As discussed herein, the bracket 115 can fit over a base 105 of a cart 100. However, the present invention is not limited to a cart 100 and a cart 100 is included for explanatory purposes only. As used herein, the term "cart" can include a cart, cabinet, table, chest, block, box, or any other physical component capable of receiving the structure of the bracket 115.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A bracket for coupling to a base, the bracket comprising:
   an arm having a first end and a second end opposite the first end;
   a corner slot located at the first end, the corner slot defining an opening having first and second sub-openings extending at a right angle to each other and adapted to receive a first end of the base when positioned on the base;
   a compression member at the second end, the compression member having a compression member body pivotable about a pivot point and a hook extending from the compression member body to engage a second end of the base opposite the first end of the base,
   wherein the compression member is engaged with the base such that, when the compression member is positioned in a first position on the base wherein the hook is engaged against the base, the compression member applies a bias force against the base, and wherein when the compression member rotates about the pivot point to a second position, the compression member disengages the hook from the base and allows removal of the bracket from the base.

2. The bracket of claim 1, wherein the corner slot includes a first slot plate and a second slot plate extending from the first slot plate at a right angle so as to form the first and second sub-openings.

3. The bracket of claim 2, wherein the first and second slot plates are spaced from the arm so as to form the opening.

4. The bracket of claim 3, wherein the first and second slot plates create an opening that is open facing the second end and the compression member, and closed facing the first end.

5. The bracket of claim 2, further comprising a side plate extending from the arm and adapted to support the bracket against the base.

6. The bracket of claim 5, wherein the side plate extends perpendicular to the arm.

7. The bracket of claim 5, further comprising holes defined within at least one of the side plate and arm and adapted to receive a fastener.

8. The bracket of claim 1, wherein the compression member includes a grip spaced from the pivot point and allowing a user to lift the compression member to engage or disengage the hook.

9. A bracket and base combination comprising:
   a base having at least one corner; and
   a bracket including:
   an arm having a first end and a second end opposite the first end;
   a corner slot located at the first end, the corner slot defining an opening having first and second sub-openings extending at a right angle to each other and adapted to receive a first end of the base when positioned on the base;
   a compression member at the second end, the compression member having a compression member body pivotable about a pivot point and a hook extending from the compression member body to engage a second end of the base opposite the first end of the base, wherein the compression member is engaged with the base such that, when the compression member is positioned in a first position on the base wherein the hook is engaged against the base, the compression member applies a bias force against the base, and wherein when the compression member rotates about the pivot point to a second position, the compression member disengages the hook from the base and allows removal of the bracket from the base.

10. The combination of claim 9, wherein the corner slot includes a first slot plate and a second slot plate extending from the first slot plate at a right angle so as to form the first and second sub-openings.

11. The combination of claim 10, wherein the first and second slot plates are spaced from the arm so as to form the opening.

12. The combination of claim 11, wherein the first and second slot plates create an opening that is open facing the second end and the compression member, and closed facing the first end.

13. The combination of claim 10, further comprising a side plate extending from the arm and adapted to support the bracket against the base.

14. The combination of claim 13, wherein the side plate extends perpendicular to the arm.

15. The combination of claim 13, further comprising holes defined within at least one of the side plate and arm and adapted to receive a fastener.

16. The combination of claim 9, wherein the compression member includes a grip spaced from the pivot point and allowing a user to lift the compression member to engage or disengage the hook.

17. The combination of claim 9, further comprising a board coupled to the bracket.

18. The combination of claim 9, wherein the base is shaped as a rectangular prism.

* * * * *